(12) United States Patent
Sanders et al.

(10) Patent No.: US 9,709,754 B2
(45) Date of Patent: Jul. 18, 2017

(54) SHUTTERED LC ADAPTER

(71) Applicant: Panduit Corp., Tinley Park, IL (US)

(72) Inventors: Joseph E. Sanders, Elwood, IL (US);
Gregory L. Kuffel, Plainfield, IL (US);
Phillip J. Irwin, Frankfort, IL (US);
Samuel M. Marrs, Bradley, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 15/350,291

(22) Filed: Nov. 14, 2016

(65) Prior Publication Data

US 2017/0059787 A1     Mar. 2, 2017

Related U.S. Application Data

(63) Continuation of application No. 13/828,392, filed on Mar. 14, 2013, now Pat. No. 9,494,746, which is a continuation-in-part of application No. 13/293,591, filed on Nov. 10, 2011, now Pat. No. 9,196,997.

(51) Int. Cl.
*G02B 6/38*     (2006.01)

(52) U.S. Cl.
CPC ......... *G02B 6/3849* (2013.01); *G02B 6/3825* (2013.01); *G02B 6/3879* (2013.01)

(58) Field of Classification Search
None
See application file for complete search history.

(56) References Cited

U.S. PATENT DOCUMENTS

| | | | |
|---|---|---|---|
| 4,345,808 A | 8/1982 | Ingham |
| 5,363,460 A | 11/1994 | Marazzi et al. |
| 5,716,224 A | 2/1998 | Masuda et al. |
| 5,883,995 A | 3/1999 | Lu |
| 5,909,526 A | 6/1999 | Roth et al. |
| 6,004,043 A | 12/1999 | Abendschein et al. |
| 6,039,585 A | 3/2000 | Kim et al. |
| 6,079,881 A | 6/2000 | Roth |
| 6,081,647 A | 6/2000 | Roth |
| 6,104,482 A | 8/2000 | Brower et al. |
| 6,206,577 B1 | 3/2001 | Hall, III et al. |
| 6,240,229 B1 | 5/2001 | Roth |
| 6,247,849 B1 | 6/2001 | Liu |
| 6,296,398 B1 | 10/2001 | Lu |

(Continued)

FOREIGN PATENT DOCUMENTS

| CN | 1849730 A | 10/2006 |
|---|---|---|
| EP | 0893716 A1 | 1/1999 |

(Continued)

*Primary Examiner* — Tina Wong
(74) *Attorney, Agent, or Firm* — Christopher S. Clancy; James H. Williams; Christopher K. Marlow

(57) ABSTRACT

A shuttered adapter is described that includes a shuttered housing, a shutter sub-assembly frame contained within the housing, a pair of shutter doors hingedly secured to the shutter sub-assembly frame, and a door spring configured to push the shutter doors outward from the shutter sub-assembly frame and away from each other. The shuttered housing can have a separable sleeve retention insert which allows a ledge to be molded inside the shuttered housing. The ledge can be configured to abut the front lower surface of the shuttered doors when the doors are pushed outward from the shutter sub-assembly frame.

1 Claim, 21 Drawing Sheets

(56) References Cited

U.S. PATENT DOCUMENTS

| | | |
|---|---|---|
| 6,302,592 B1 | 10/2001 | Züllig |
| 6,461,054 B1 | 10/2002 | Iwase |
| 6,471,412 B1 | 10/2002 | Belenkiy et al. |
| 6,524,014 B2 | 2/2003 | Stephenson et al. |
| 6,595,696 B1 | 7/2003 | Zellak |
| 6,685,362 B2 | 2/2004 | Burkholder et al. |
| 6,688,780 B2 | 2/2004 | Duran |
| 6,715,930 B2 | 4/2004 | McBride |
| 6,764,222 B1 | 7/2004 | Szilagyi et al. |
| 6,789,950 B1 | 9/2004 | Loder et al. |
| 6,866,242 B2 | 3/2005 | Hirota |
| 7,261,472 B2 | 8/2007 | Suzuki et al. |
| 7,284,912 B2 | 10/2007 | Suzuki et al. |
| 7,340,146 B2 | 3/2008 | Lampert et al. |
| 7,676,133 B2 | 3/2010 | Lampert et al. |
| 7,686,518 B2 | 3/2010 | Case et al. |
| 7,703,987 B2 | 4/2010 | Kramer et al. |
| 7,785,018 B2 | 8/2010 | Jones et al. |
| 7,837,395 B2 | 11/2010 | Lin et al. |
| 7,841,777 B2 | 11/2010 | Howard et al. |
| 8,348,517 B2 | 1/2013 | Mudd et al. |
| 8,559,786 B2 | 10/2013 | Ciechomski et al. |
| 8,770,860 B2 * | 7/2014 | Affre De Saint Rome ............... G02B 6/3849 385/55 |
| 2001/0048790 A1 | 12/2001 | Burkholder et al. |
| 2004/0062486 A1 * | 4/2004 | Tanaka ................ G02B 6/3825 385/55 |
| 2005/0281509 A1 | 12/2005 | Cox et al. |
| 2007/0230874 A1 | 10/2007 | Lin |
| 2008/0267566 A1 | 10/2008 | En Lin |
| 2009/0028507 A1 | 1/2009 | Jones et al. |
| 2011/0038581 A1 | 2/2011 | Mudd et al. |

FOREIGN PATENT DOCUMENTS

| | | |
|---|---|---|
| EP | 1335455 A1 | 8/2003 |
| JP | 2002023008 A | 1/2002 |
| JP | 2002116350 A | 4/2002 |
| JP | 2008046146 A | 2/2008 |
| JP | 2008225133 A | 9/2008 |
| JP | 2010008992 A | 1/2010 |

* cited by examiner

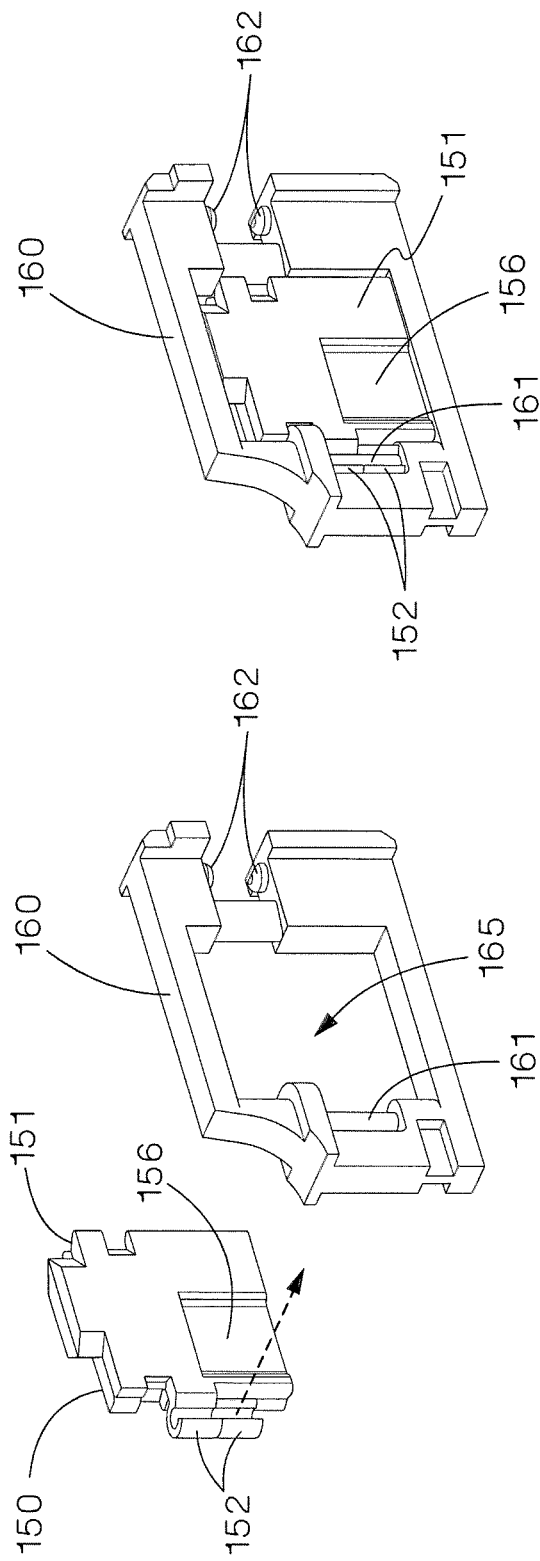

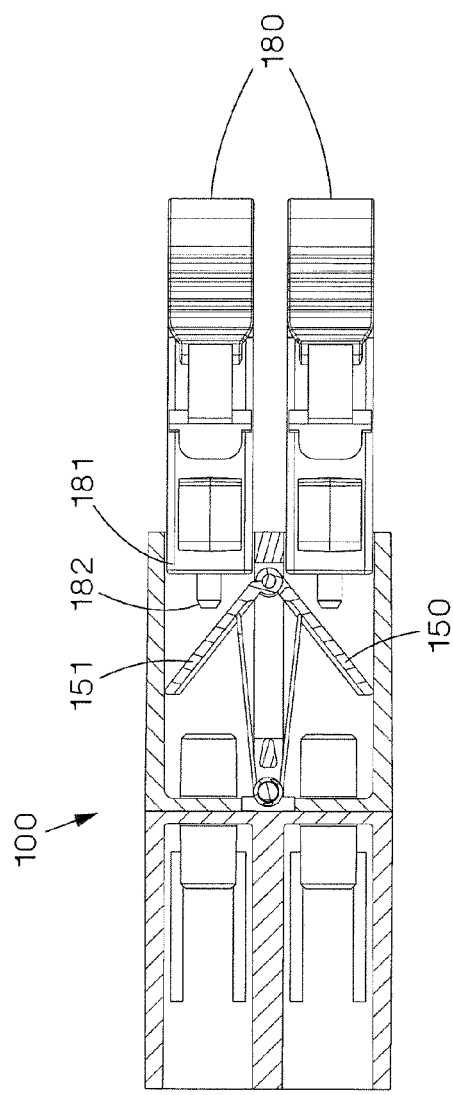
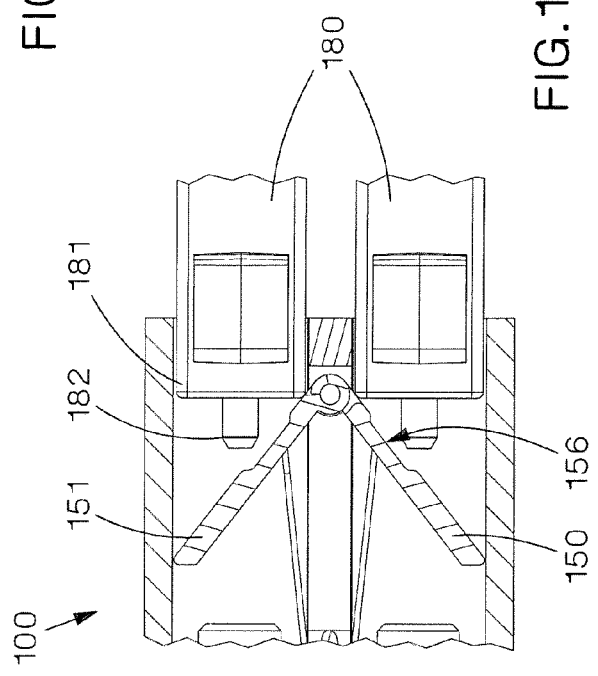
FIG. 11
FIG. 12

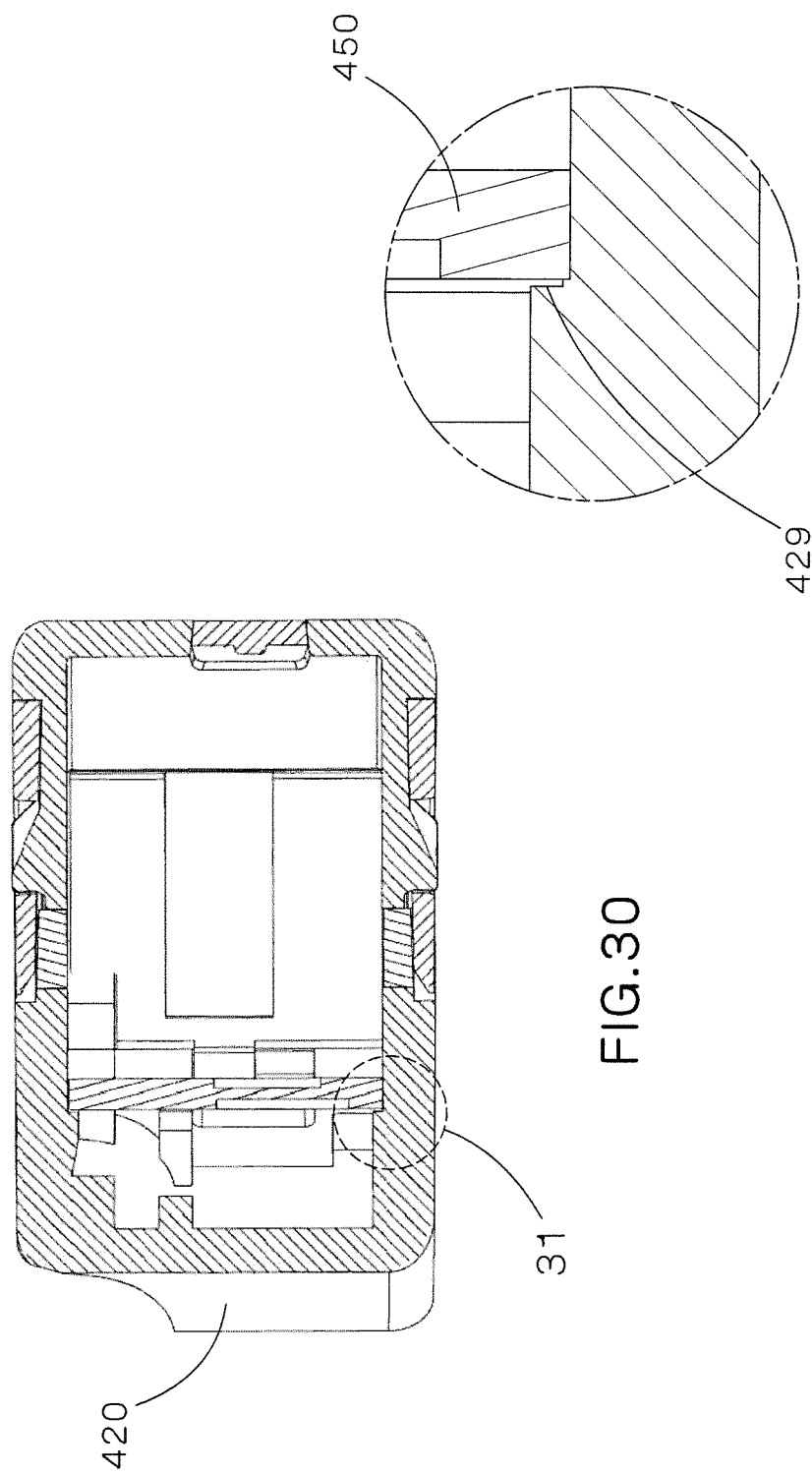

SHUTTERED LC ADAPTER

CROSS REFERENCE TO RELATED APPLICATION

This application is a continuation of U.S. patent application Ser. No. 13/828,392, filed Mar. 14, 2013, which will issue as U.S. Pat. No. 9,494,746 on Nov. 15, 2016; which is a continuation in part of U.S. patent application Ser. No. 13/293,591, filed on Nov. 10, 2011, which issued as U.S. Pat. No. 9,196,997 on Nov. 24, 2015, which is incorporated by reference in its entirety.

FIELD OF THE INVENTION

The present invention relates generally to fiber optic connections and more specifically to a shuttered LC fiber optic adapter.

BACKGROUND OF THE INVENTION

Optical adapters can provide connections between optical connectors. However, the cavities within the connectors are susceptible to dust and debris. In addition, light emitted from an uncovered connector can damage the eyes of a worker or technician who is installing or repairing a fiber optic system.

SUMMARY OF THE INVENTION

This application describes a shuttered LC adapter that includes a shuttered housing, a shutter sub-assembly frame contained within the housing, a pair of shutter doors hingedly secured to the shutter sub-assembly frame, and a door spring configured to push the shutter doors outward from the shutter sub-assembly frame and away from each other.

In some embodiments, the shutter sub-assembly frame is retained within the shuttered housing by sliding into a slot located in the rear of the shuttered housing.

In some embodiments, the shutter doors are hingedly secured to the shutter sub-assembly frame via c-clamps on the shutter doors engaging a post on the shutter sub-assembly frame or via a post and hole assembly on the shutter doors and retention bumps on the shutter door and shutter-sub-assembly frame.

In some embodiments, the door spring is a formed wire torsion spring and can include a spring body and a pair of spring arms. The door spring can be attached to the shutter sub-assembly frame via retention bumps.

In some embodiments, the door spring can be a flat formed spring.

In some embodiments, the shutter doors include ferrule relief pockets.

In some embodiments, the standard housing and the shuttered housing have retention bores that are aligned with each other. Alignment sleeves can be retained within the retention bores.

The present invention also describes a shuttered LC adapter that includes a housing and a spring-like shutter attached to the front of the center wall of the housing. The shutter has a pair of door flaps extending into the ports of the adapter at a rearward angle.

In some embodiments, the shutter can be composed of a spring-like metal such as spring steel.

BRIEF DESCRIPTION OF FIGURES

FIGS. 3 and 4 are perspective views showing the shutter doors of the shuttered LC adapter of FIG. 1 being attached to the shutter sub-assembly frame.

FIGS. 11-13 are top down cross-sectional views of the shuttered LC adapter of FIG. 1 showing the insertion of a duplex connector into the shuttered LC adapter.

FIG. 30 is a cross-sectional view taken along line 30-30 of FIG. 29.

FIG. 31 is an enlarged view of detail 31 of FIG. 30.

DETAILED DESCRIPTION OF THE PREFERRED EMBODIMENTS

Figure 1:
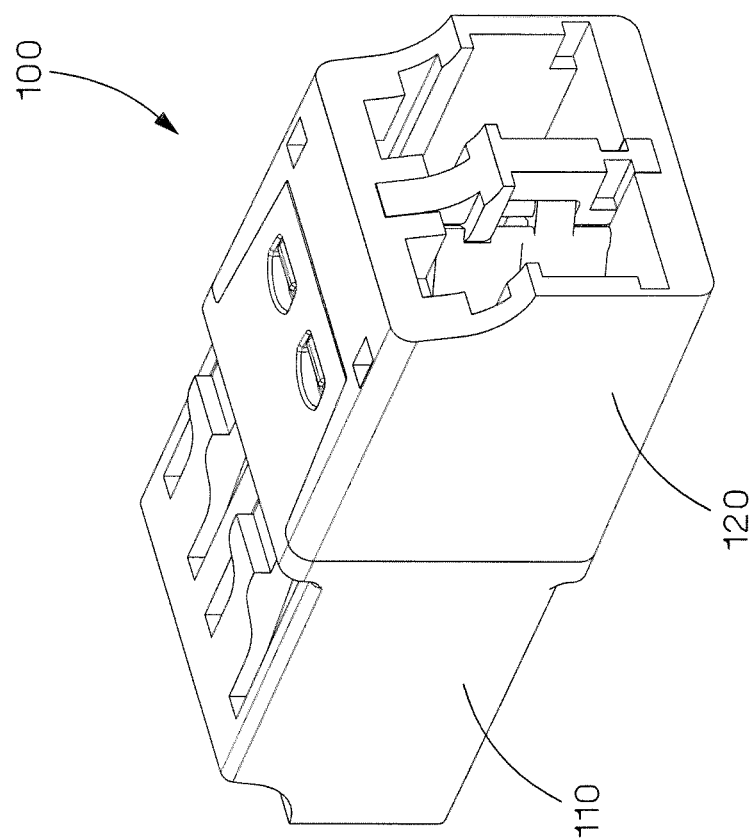
FIG. 1 is a perspective view of a first embodiment of a shuttered LC adapter.
Figure 2:
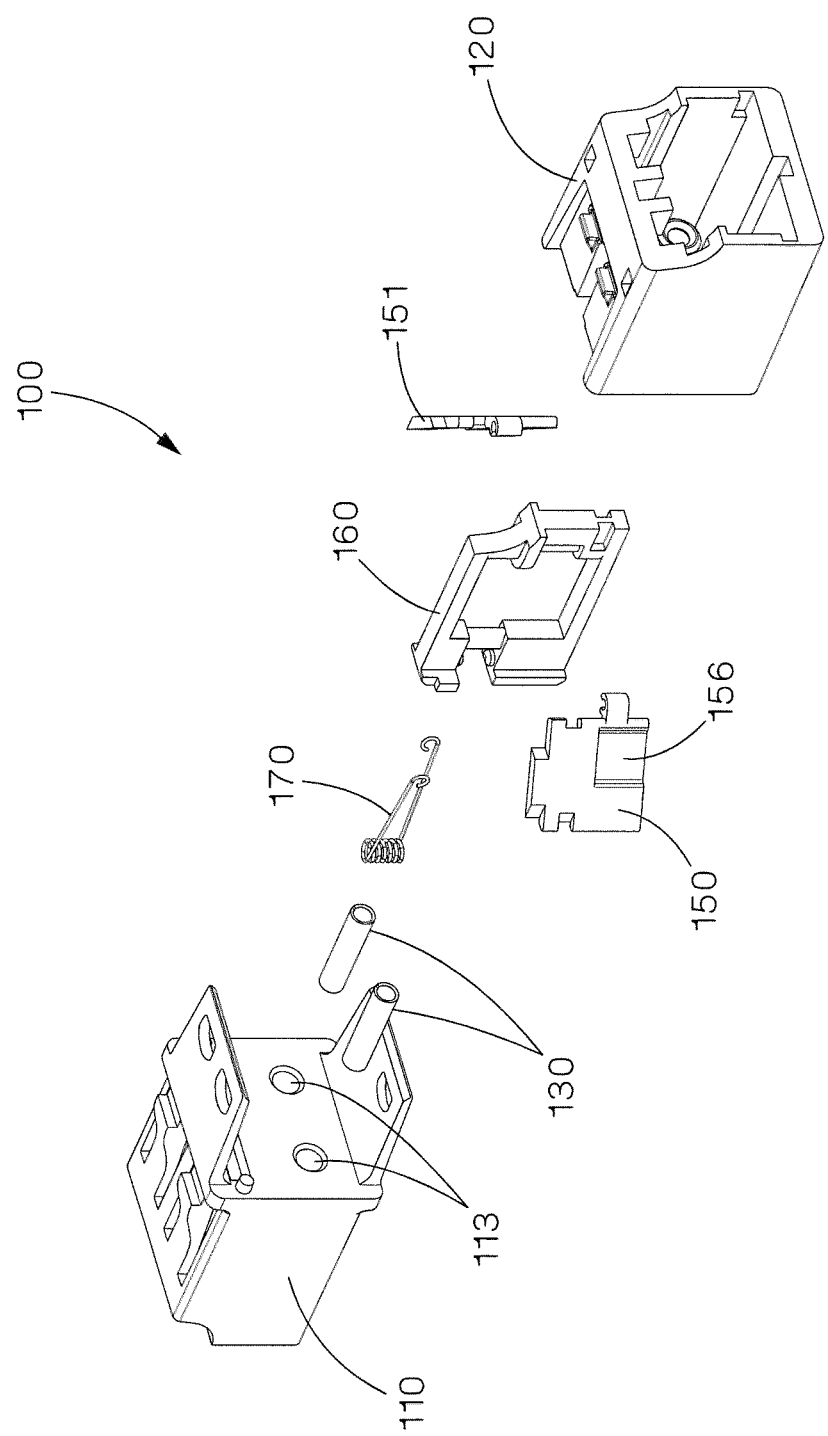
FIG. 2 is an exploded perspective view of the shuttered LC adapter of FIG. 1.

FIGS. 1-13 show a first embodiment of a shuttered LC adapter 100. As best shown in FIG. 2, the adapter includes a standard housing 110, a shuttered housing 120, alignment sleeves 130, shutter doors 150, 151, a shutter sub-assembly frame 160, and a door spring 170.

As best shown in FIGS. 3 and 4, the shutters doors 150, 151 can be nested together and attached to a frame post 161 on the shutter sub-assembly frame 160 via c-clamps 152 located on the shutter doors 150, 151. The c-clamps 152 can be arranged such that when the shutter doors 150, 151 are nested together the c-clamp 152 of the first door 150 sits directly above the c-clamp 152 of the second door 151.

Figure 6:
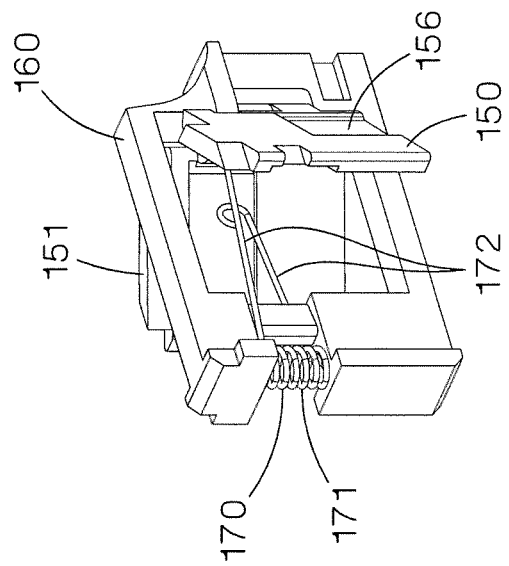
FIGS. 5 and 6 are perspective views showing the door spring of the shuttered LC adapter of FIG. 1 being attached to the shutter sub-assembly frame.
Figure 5:
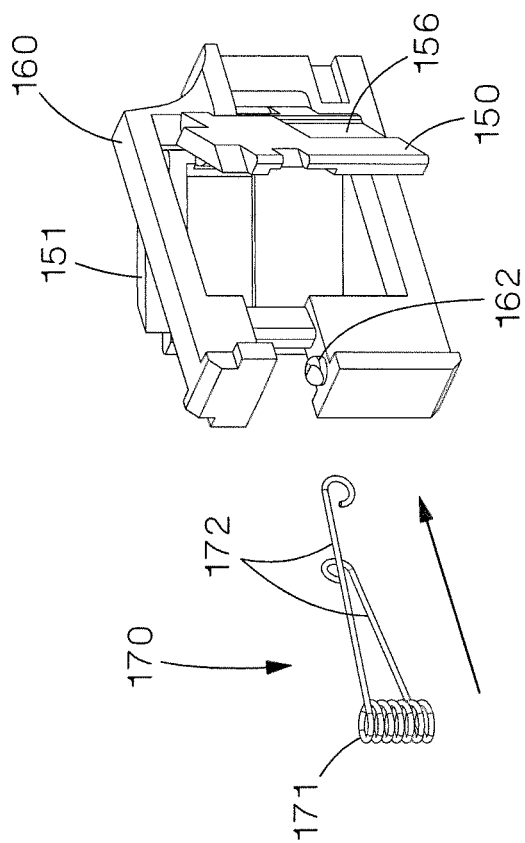

As shown in FIGS. 5 and 6, the door spring 170 has a spring body 171 and a pair of spring arms 172. The spring body 170 attaches to the rear of the shutter sub-assembly frame 160 via a pair of retention bumps 162 located on the shutter sub-assembly frame 160 (see FIGS. 3 and 4 for the best views of the retention bumps 162). The spring arms 172 are configured to be inserted in between the shutter doors 150, 151 and provide a force that pushes the shutter doors 150, 151 outward from the shutter sub-assembly frame 160 and away from one another.

Figure 7:
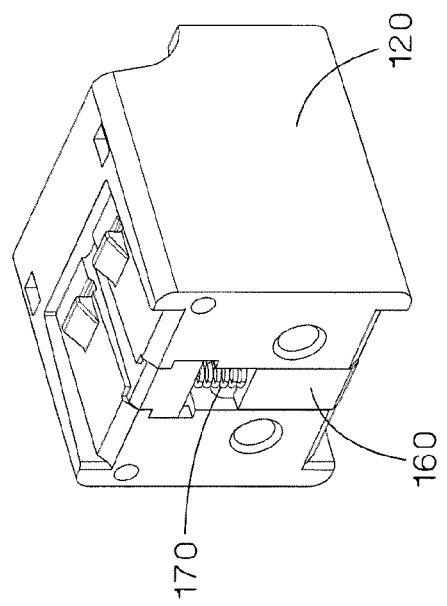
FIGS. 7 and 8 are perspective views showing the insertion of the door spring, shutter doors, and shutter sub-assembly frame into the shuttered housing.
Figure 8:
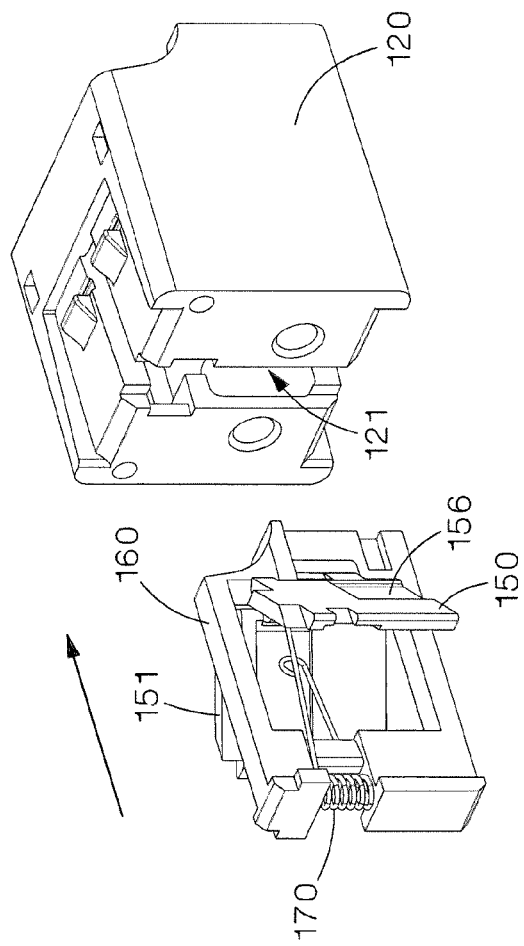

As shown in FIGS. 7 and 8, the shutter sub-assembly frame 160, the shutter doors 150, 151, and the door spring 170 are inserted into a slot 121 located in the rear of the shuttered housing 120.

Figure 9:
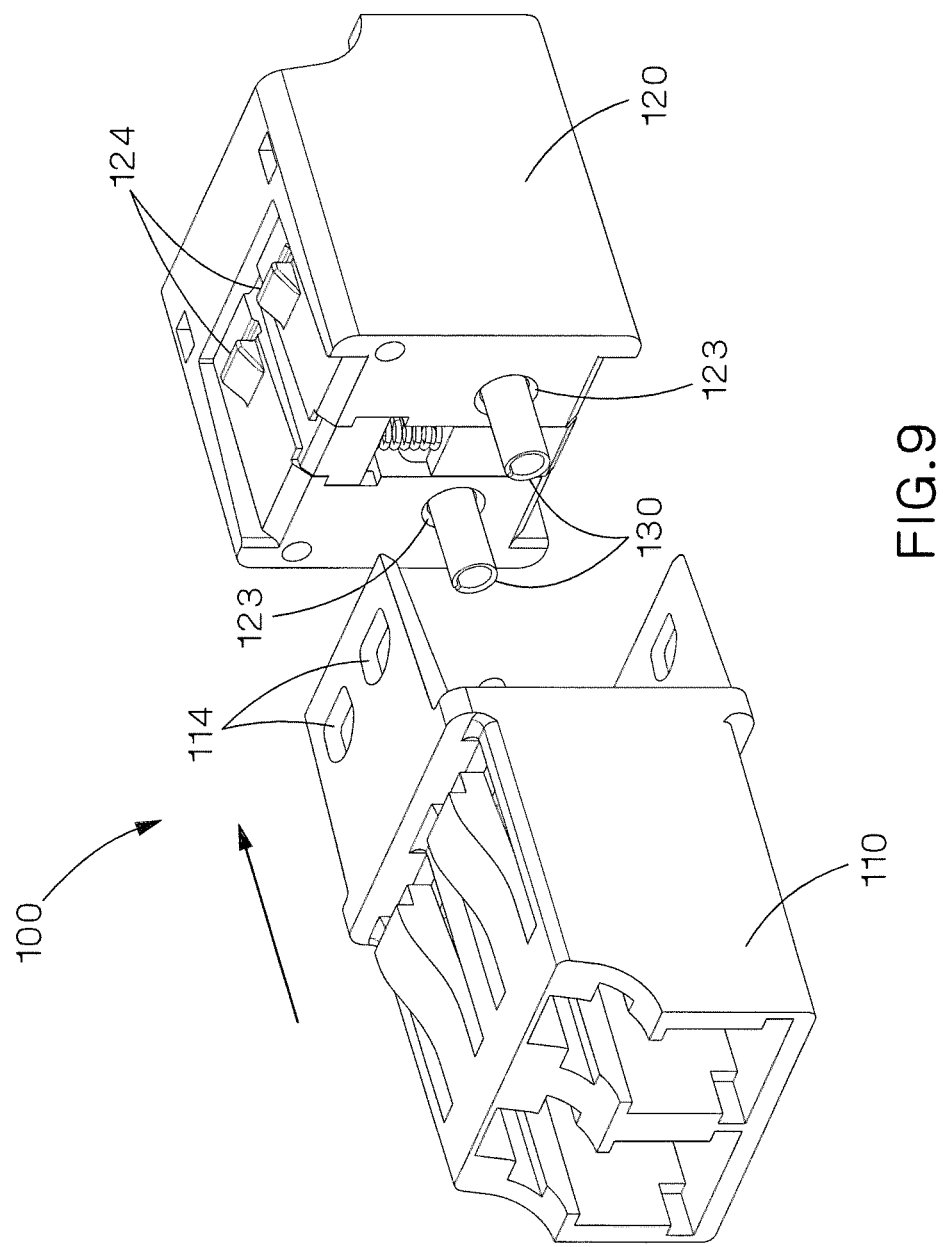
FIGS. 9 and 10 show the standard housing of the shuttered LC adapter of FIG. 1 being secured to the shuttered housing, including showing the alignment sleeves being placed within the retention bores.
Figure 10:
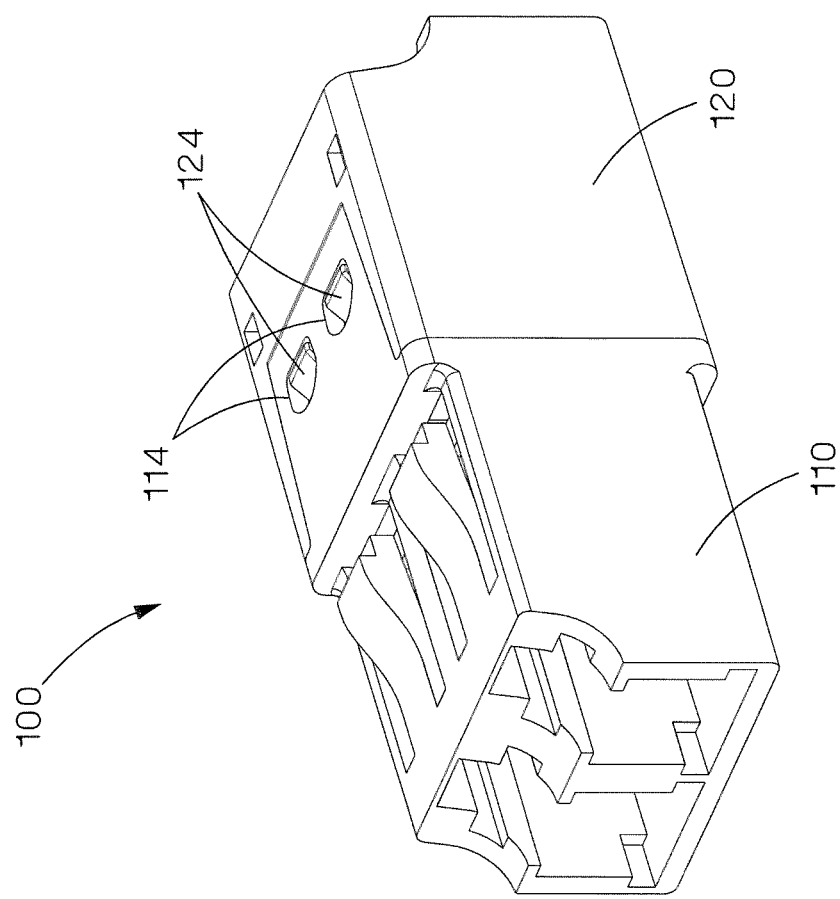

FIGS. 9 and 10 show the alignment sleeves 130 being inserted into the retention bores 123 of the shuttered housing 120 and then show the standard housing 110 being attached to the shuttered housing 120. The retention bores 123 of the shuttered housing 120 are configured to align with retention bores 113 of the standard housing 110 when the standard housing 110 is attached to the shuttered housing 120 (see FIG. 2 for the best view of the retention bores 113 of the standard housing 110). The alignment sleeves 130 are retained within the retention bores 113, 123 of both the shuttered housing 120 and the standard housing 110. In the embodiments of FIGS. 1-13, the standard housing 110 attaches to the shuttered housing 120 via complimentary snap features 114, 124, however, the present invention is not limited to these features as other means known in the art may be used to secure two housing parts together.

Figure 13:
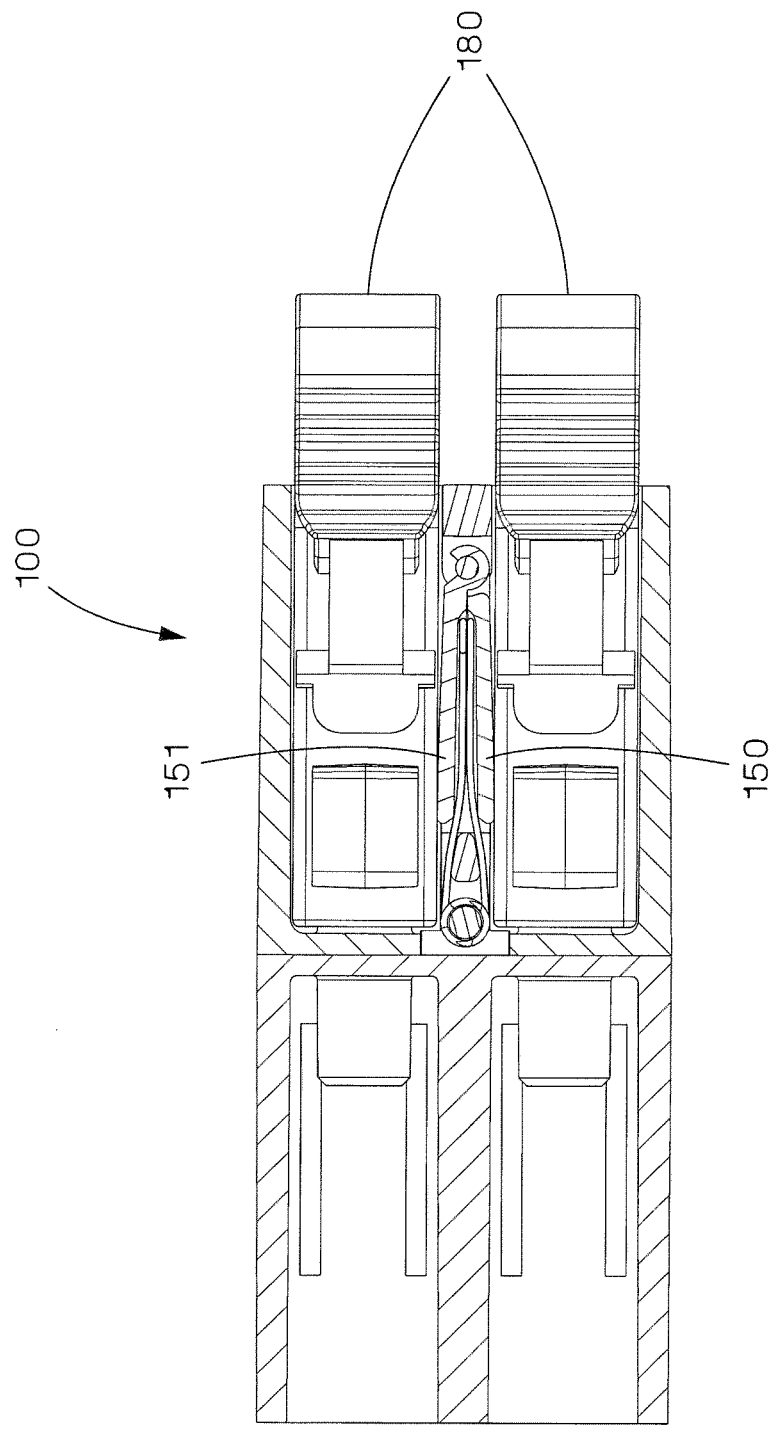
Figure 14:
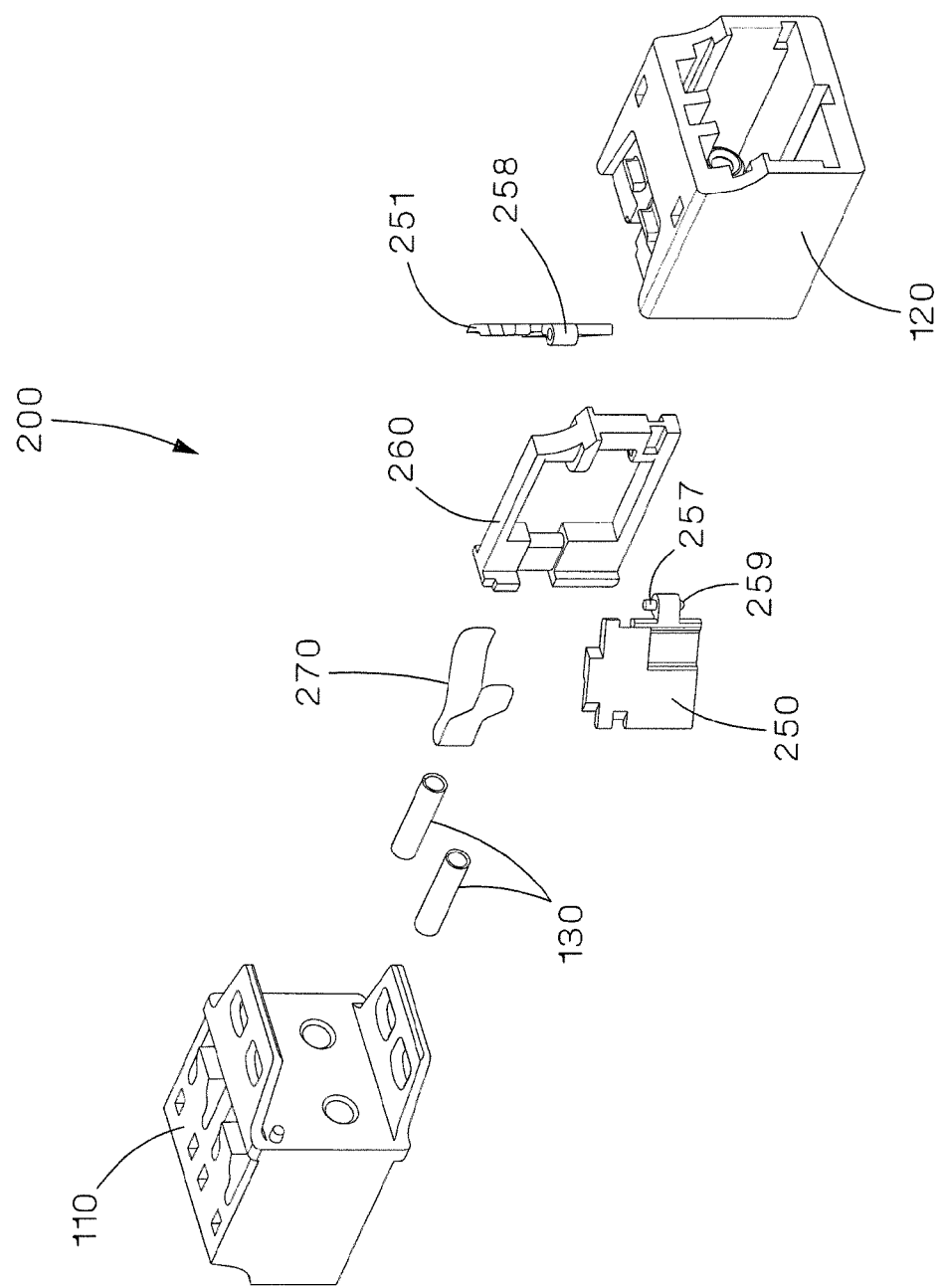
FIG. 14 is an exploded perspective view of a second embodiment of a shuttered LC adapter.
Figure 16:
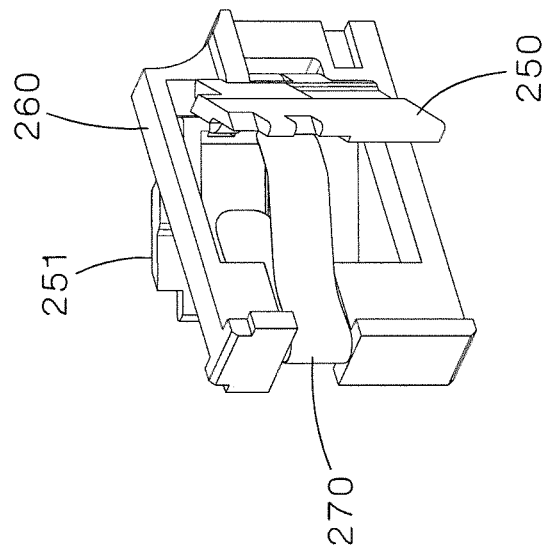
FIGS. 15 and 16 are perspective views showing the door spring of the shuttered LC adapter of FIG. 14 being attached to the shutter sub-assembly frame and inserted between the shutter doors.
Figure 15:
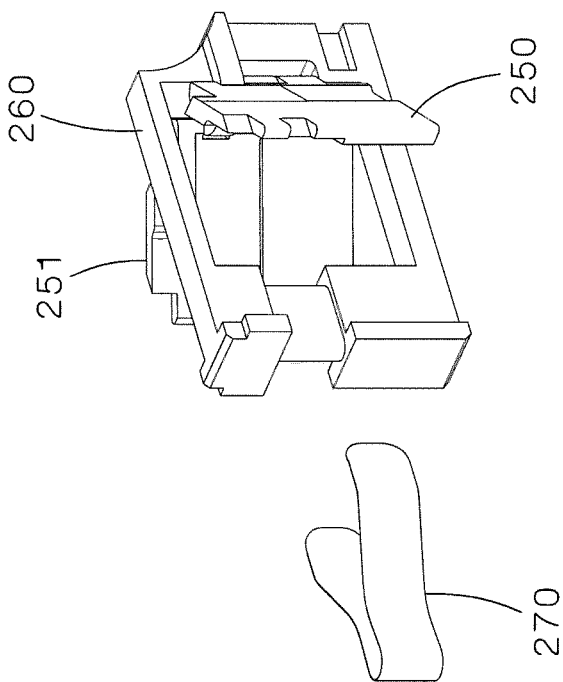
Figure 17:
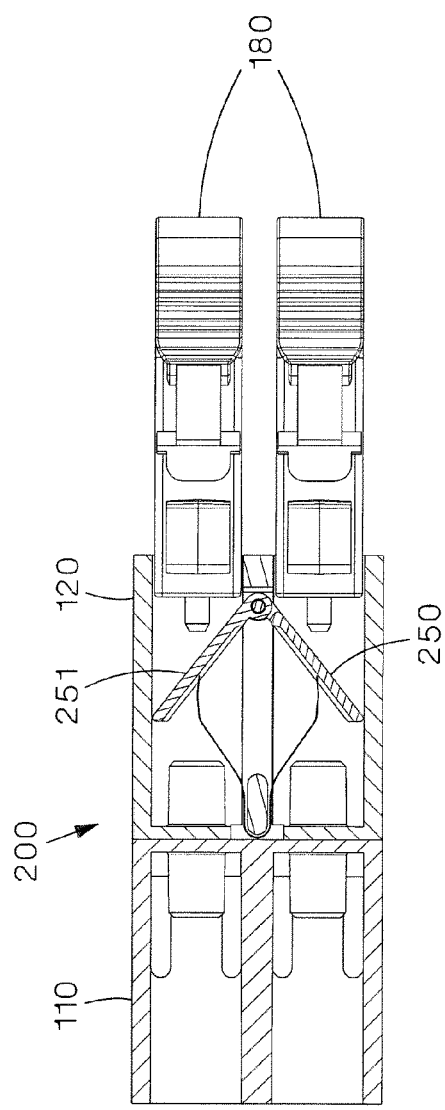
FIGS. 17-19 are top down cross-sectional views of the shuttered LC adapter of FIG. 14 showing the insertion of a duplex connector into the shuttered LC adapter.
Figure 18:
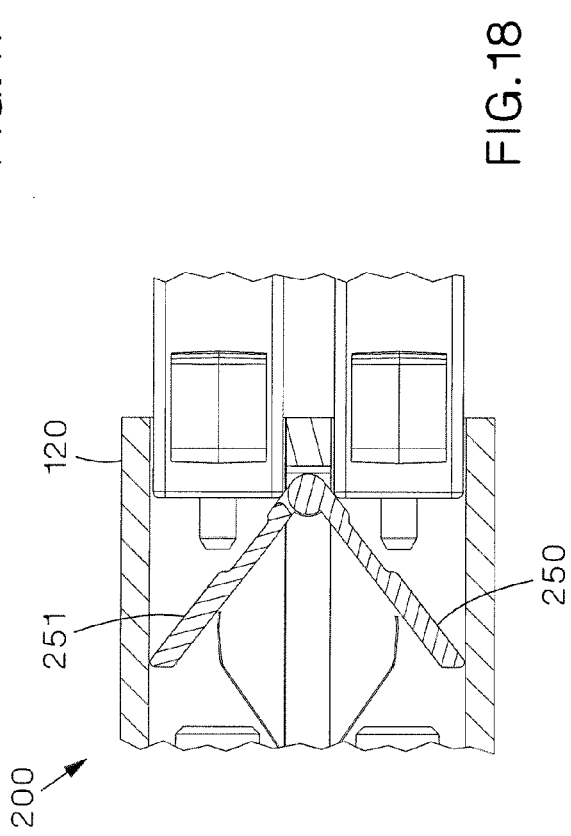
Figure 19:
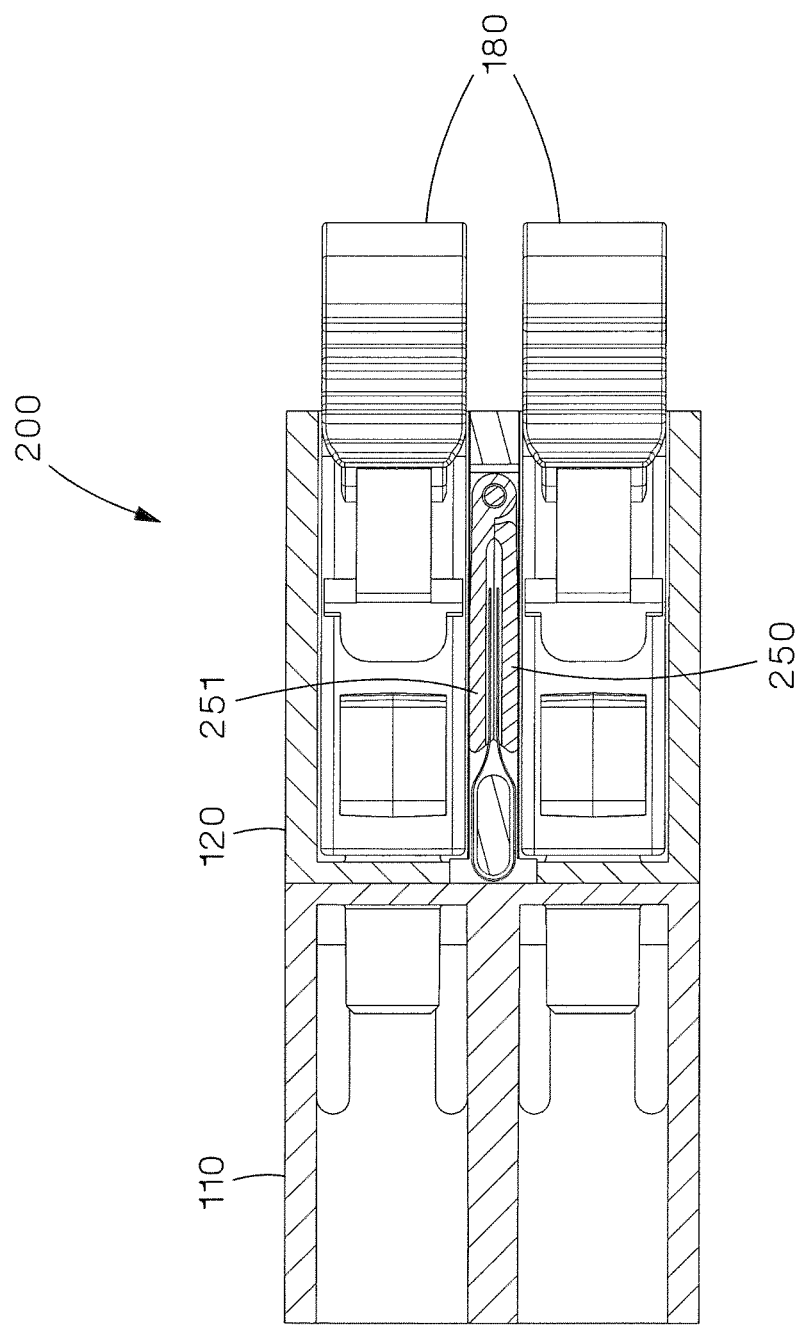
Figure 21:
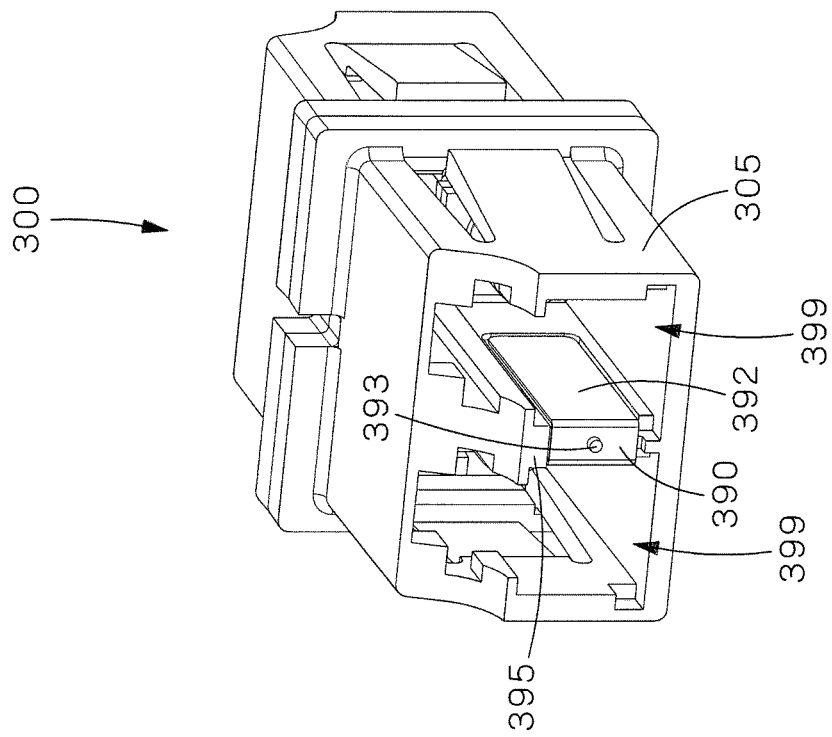
FIGS. 20 and 21 are perspective views showing a third embodiment of a shuttered LC adapter.
Figure 20:
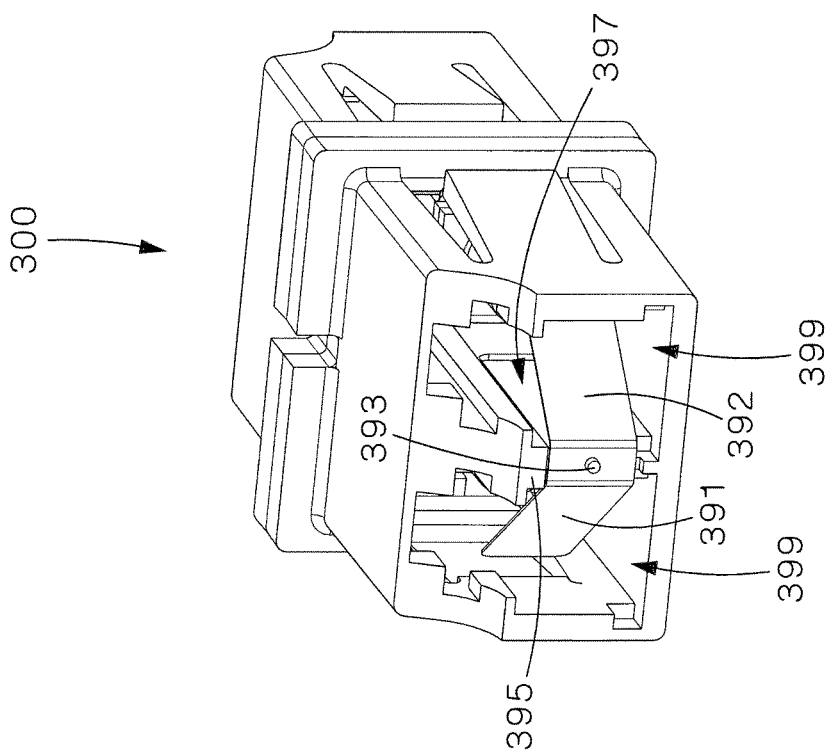

As shown in FIGS. 11-13, when a fiber optic connector 180 is inserted into the shuttered housing 120, the shutter doors 150, 151 are pushed inward and towards each other until they reside with an opening 165 (see FIG. 3 for the best view of the opening 165) in the shutter sub-assembly frame 160. The shutter doors 150, 151 are preferably configured to be at a rearward angle (even when a fiber optic plug has not been inserted into the shuttered housing) such as to allow the housing 181 of the LC connector 180 to make contact with the shutter doors 150, 151 and push them inward and towards each other before the ferrule 182 of the connector 180 can make contact with the shutter doors 150, 151 in order to prevent the shutter doors 150, 151 from damaging the ferrule 182 when the connector 180 is inserted into the shuttered housing 120 (this is best shown in FIG. 12). In one embodiment, ferrule relief pockets 156 can be cut into the front of the shutter doors 150, 151 in order to aid in preventing the ferrule 182 from making contact with the shutter doors 150, 151 (see also FIGS. 3 and 4 for views of the ferrule relief pockets 156).

FIGS. 14-19 show a second embodiment of a shuttered LC adapter 200. This embodiment is similar to the first embodiment, except it shows a different door spring 270 (specifically, a flat formed spring as opposed to the formed wire torsion spring of the first embodiment), and the shutter doors 250, 251 are attached to the shutter sub-assembly frame 260 by a post and hole assembly 257, 258 on the shutter doors and retention bumps 259 on one of the shutter doors 250 and on the shutter sub-assembly frame 260 (the retention bump on the shutter sub-assembly frame is not shown).

FIGS. 20-24 show a third embodiment of a shuttered LC adapter 300. This embodiment utilizes a shutter 390 formed from a thin piece of spring-like material such as a resilient metal like spring steel attached onto the front of the center wall 395 of an adapter housing 305. The adapter housing 305 has two LC port openings 399 with a center wall 395 separating them. The shutter 390 has first and second door flaps 391, 392 that extend into the housing at a rearward angle relative to the faces of the LC port openings 399. In one embodiment, the shutter 390 can be "staked" into position using an ultrasonic welder to melt and compress a feature 393 on the center wall 395 of the adapter housing 305.

Figure 22:
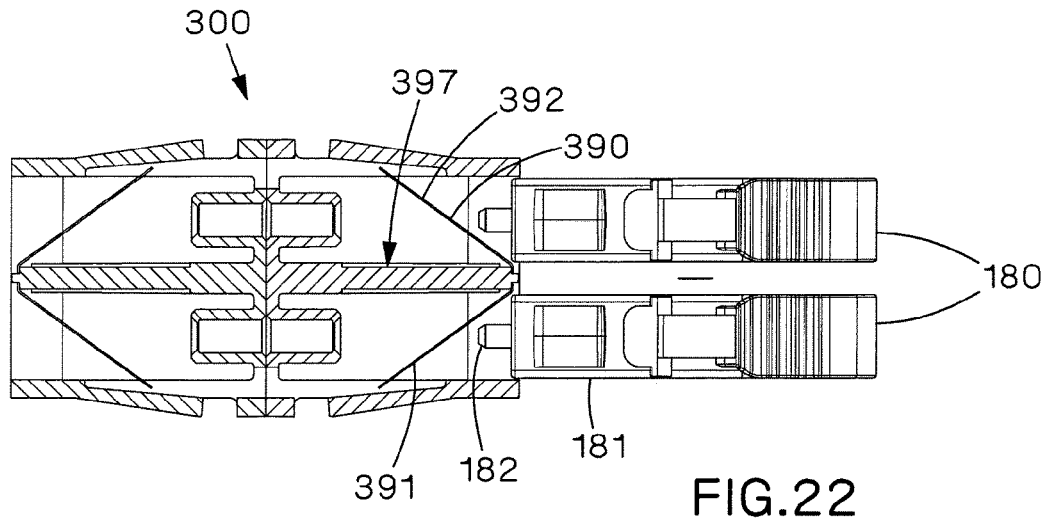
FIGS. 22-24 are top down cross-sectional views of the shuttered LC adapter of FIGS. 20 and 21 showing the insertion of a duplex connector into the shuttered LC adapter.
Figure 23:
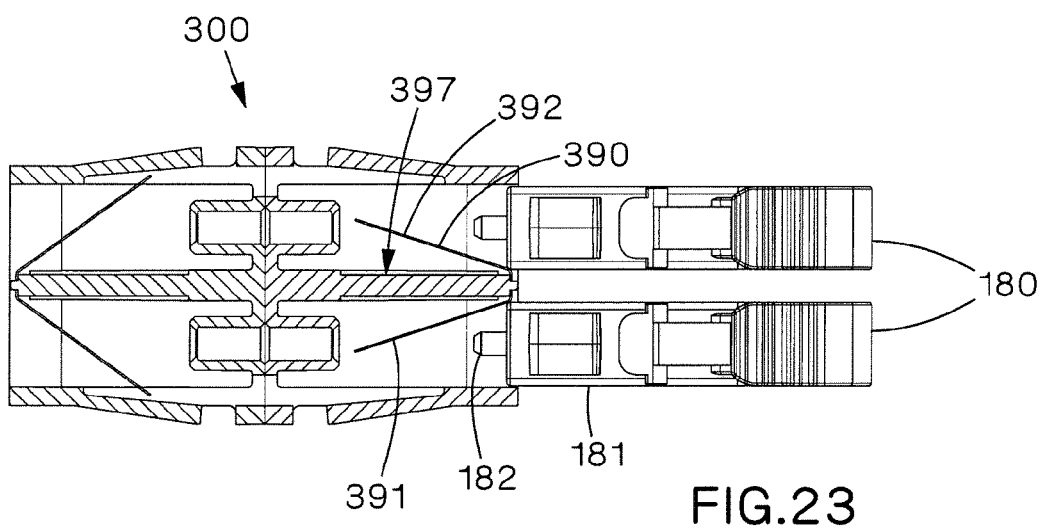
Figure 24:
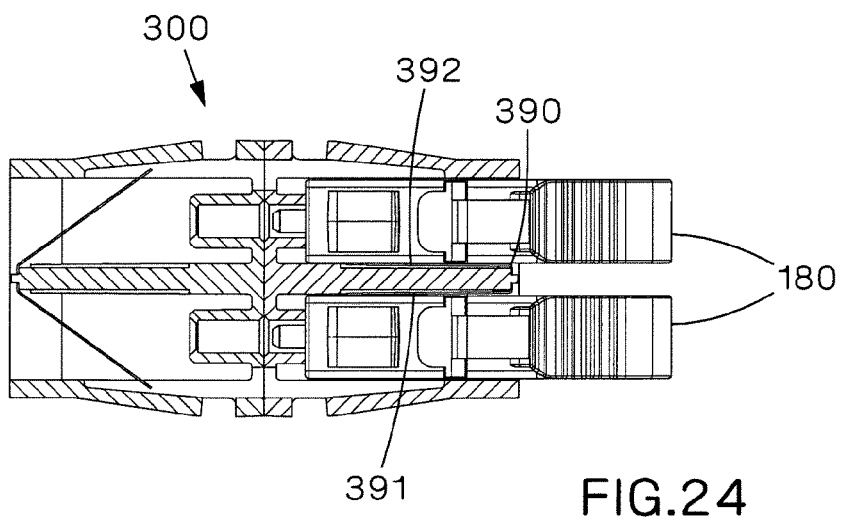
Figure 25:
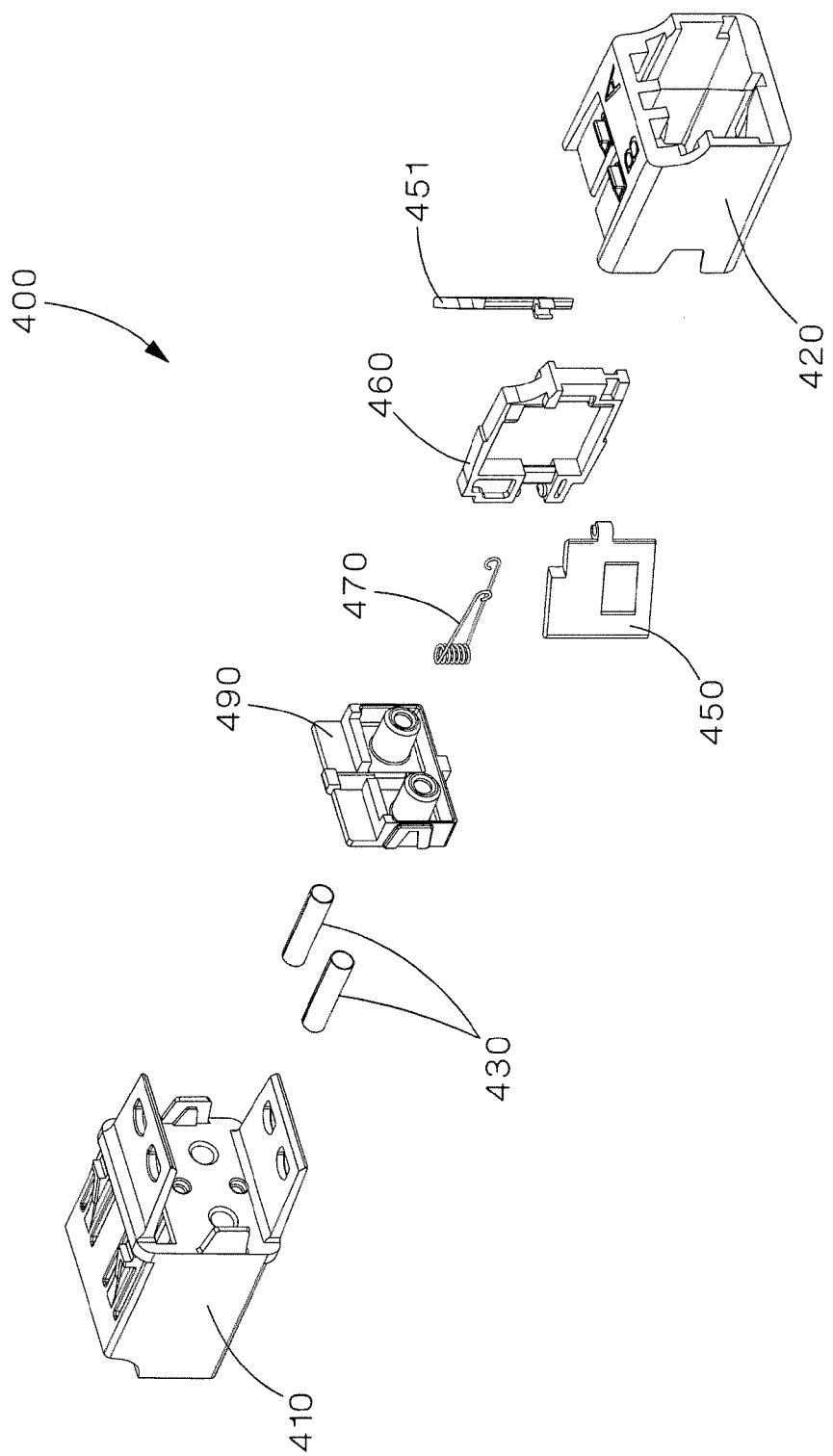
FIG. 25 is an exploded perspective view of a fourth embodiment of a shuttered LC adapter.

As shown in FIGS. 22-24, when a connector 180 is inserted into the adapter 300, the first and second door flaps 391, 392 deflect into a recess 397 within the center wall 395 of the adapter 300, allowing mechanical integrity to be maintained by having the connector 180 contact the center wall 395 of the adapter above and below the recessed door flap 391, 392. Alternatively, the shutter 390 could be used as a side wall when deflected inward to stabilize the connector. As in the other embodiments, the shutter door flaps 391, 392 are at a rearward angle such that the body 181 of the inserted connector 180 makes contact with the door flap 391, 392, causing it to fold in the center wall 395 before the ferrule 182 of the connector 180 can make contact with the door flap 391,392. One advantage of having a shutter 390 formed of a metal as compared to plastic is that metal can withstand higher amounts of laser power than plastic.

FIGS. 25-31 show a fourth embodiment of a shuttered LC adapter 400. The shuttered LC adapter 400 is similar to the shuttered LC adapter 100, as described above with reference to FIGS. 1-13. That is, the shuttered LC adapter 400 includes a standard housing 410, a shuttered housing 420, alignment sleeves 430, shutter doors 450, 451, a shutter sub-assembly frame 460, and a door spring 470, which are similar to the standard housing 110, the shuttered housing 120, the alignment sleeves 130, the shutter doors 150, 151, the shutter sub-assembly frame 160, and the door spring 170, as described above with reference to FIGS. 1-13. However, unlike the shuttered LC adapter 100, the shuttered LC adapter 400 includes a sleeve retention insert 490, as well as alignment features, such as alignment bosses 495.

Figure 26:
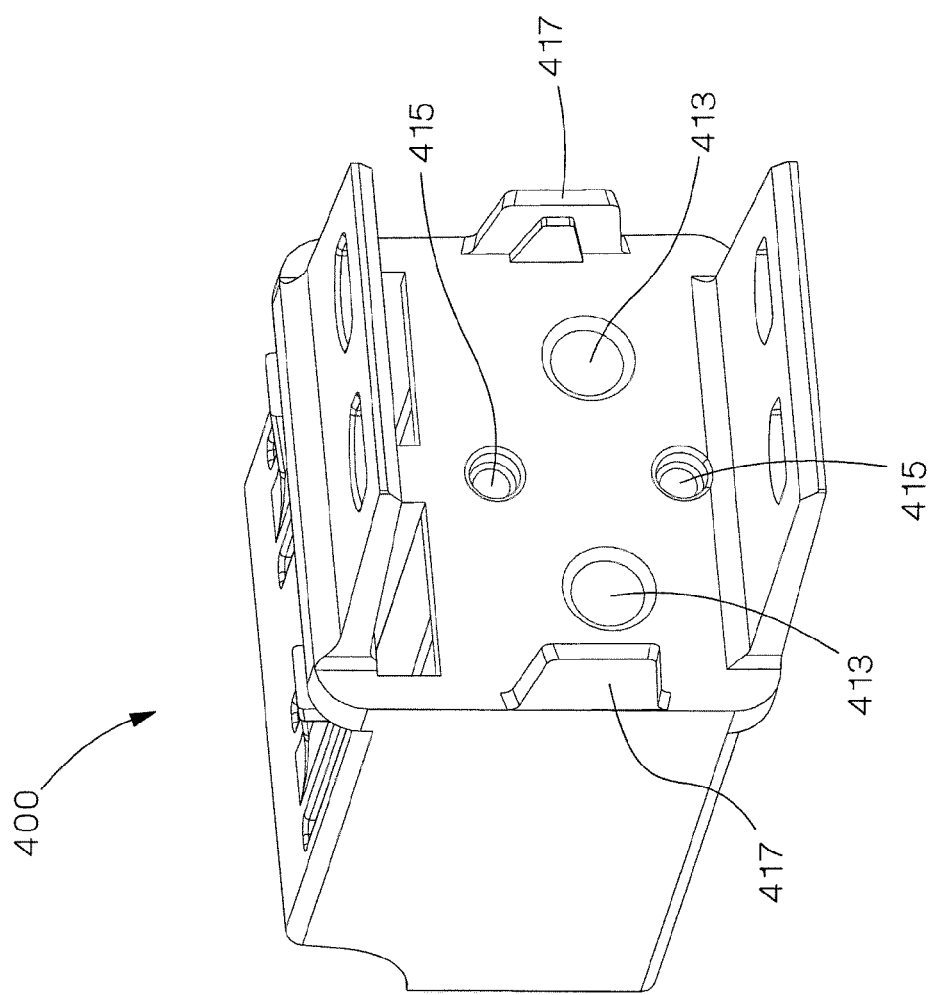
FIG. 26 is a perspective view of a standard housing for the shuttered LC adapter of FIG. 25.
Figure 27:
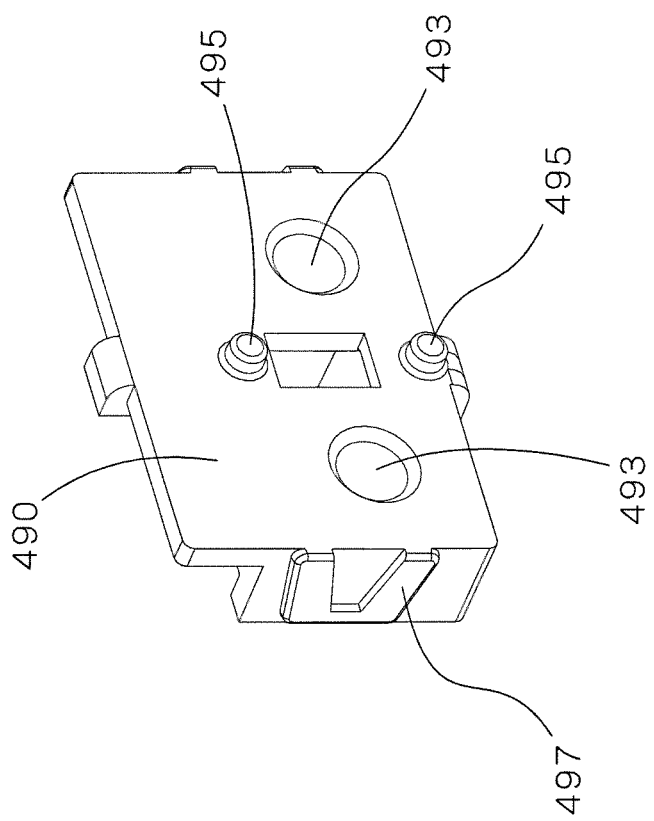
FIG. 27 is a perspective view of a sleeve retention insert for the shuttered LC adapter of FIG. 25.

As shown in FIGS. 26 and 27, the standard housing 410 and the sleeve retention insert 490 include retention bores 413 and 493, respectively, which are similar to retention bores 113 and 123, respectively, as described above with reference to FIGS. 9 and 10. Additionally, the standard housing 410 and the sleeve retention insert 490 include alignment features, such as alignment pockets 415 and alignment bosses 495, respectively, for proper alignment of the retention bores 413, 493.

Figure 28:
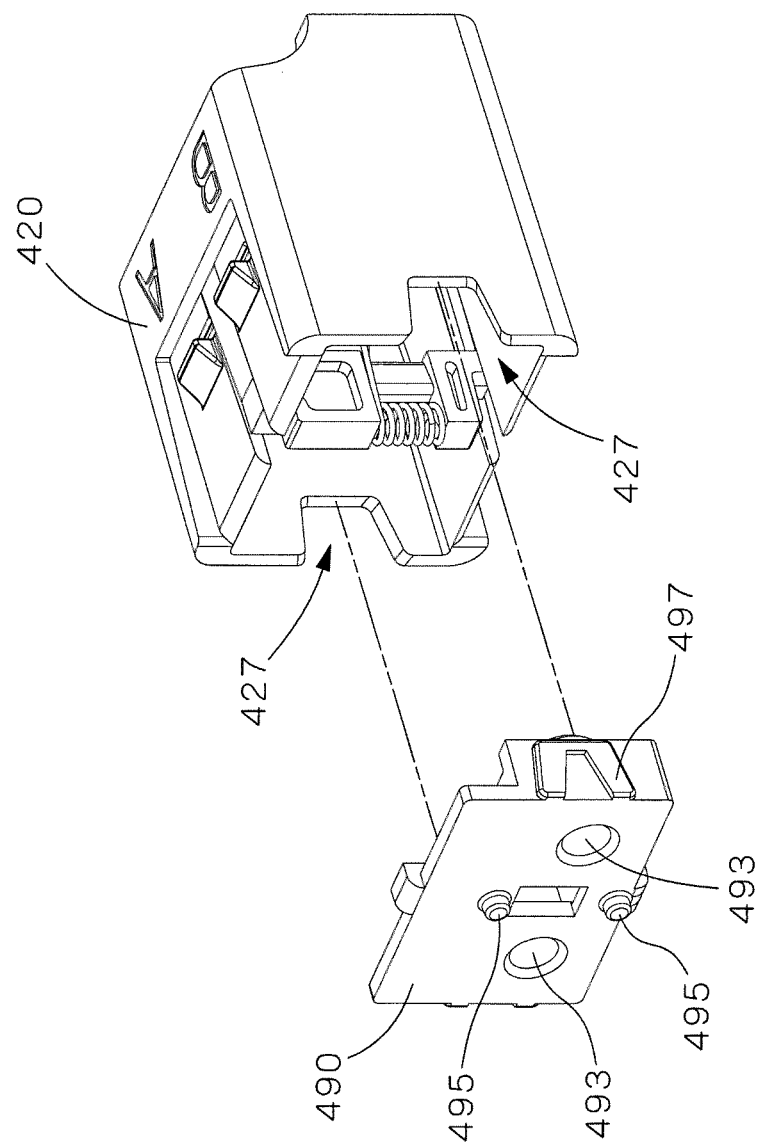
FIG. 28 is a partially exploded perspective view of the shuttered LC adapter of FIG. 25, showing the sleeve retention insert being removably connected to the shuttered housing.

As shown in FIGS. 26-28, the standard housing 410, the shuttered housing 420, and the sleeve retention insert 490 include complimentary key features 417, 427, and 497, respectively, for proper alignment of the standard housing 410, the shuttered housing 420, and the sleeve retention insert 490.

Figure 29:
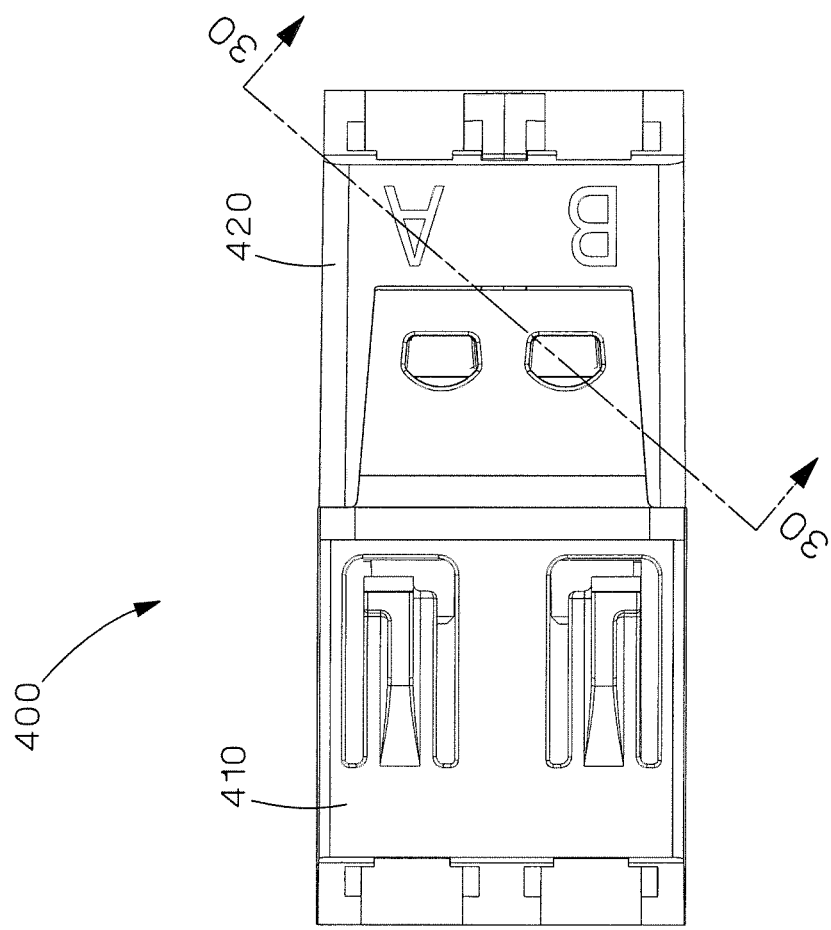
FIG. 29 is a top view of the shuttered LC adapter of FIG. 25.

As shown in FIGS. 29-31, the sleeve retention insert 490 is separable from the shuttered housing 420, which allows a ledge 429 to be formed in the shuttered housing 420. The ledge 429 can abut the front surface of the shuttered doors 450, 451, along the bottom edge of shuttered doors 450, 451, further preventing dust and other contaminants from entering the shuttered LC adapter 400.

While all of the above embodiments show duplex adapters, the present invention is not limited to duplex adapters and could be used in adapters with one, three, or even more ports. In addition, in all three of the above mentioned embodiments, the shutters or shutter doors for each side of the duplex adapters work independently, which allows simplex usage of the duplex adapter while maintaining full light and dust protection. These embodiments also allow the connector latch geometry to be located on the housing which can reduce tolerance stack up. This embodiment also allows the adapter to be converted to a non-shuttered adapter by merely removing the shutter doors on the shutter sub-assembly frame or by replacing the shutter assembly frame with a component that has a solid wall or just does not have doors. This can reduce the cost of manufacturing by allowing the same housing to be used for both shuttered and non-shuttered adapters.

In some embodiments the shutter doors could be impregnated or coated with a substance that can convert invisible transmission light into visible light.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

The invention claimed is:

1. A shuttered duplex adapter comprising:
a shuttered housing, the shuttered housing comprising a first section and a second section;
a shutter sub-assembly frame contained within the first section of the housing, the shuttered assembly frame configured to slide into a slot located in the first section via an opening wherein the opening for the slot is configured to be covered when the first section is attached to the second section;
first and second shutter doors hingedly secured to the shutter sub-assembly frame, the first and second shutter doors configured to at least partially form a wall between the adjacent fiber optic connecters when the connectors are inserted into the adjacent ports and configured to be pushed outward from the shutter sub-assembly frame and away from each other such that the first shutter door moves to block a first port of the adjacent ports and the second shutter door moves to block a second port of the adjacent ports when the fiber optic connecters are removed from the adjacent ports; and
at least one ledge molded within the housing, the at least one ledge configured to abut the front of at least one of the first and second shutter doors when the first and second shutter doors are pushed outward from the shutter sub-assembly frame.

* * * * *